March 31, 1931.  W. B. CLIFFORD  1,798,192

THERMOSTAT

Filed July 9, 1925

Witness:

Alfred H. McGlinchey.

Inventor:
Walter B. Clifford
by his attorneys
Van Buren Fish Hildreth & Cary

Patented Mar. 31, 1931

1,798,192

UNITED STATES PATENT OFFICE

WALTER B. CLIFFORD, OF FRAMINGHAM, MASSACHUSETTS, ASSIGNOR, BY MESNE ASSIGNMENTS, TO CLIFFORD MANUFACTURING CO., OF BOSTON, MASSACHUSETTS, A CORPORATION OF DELAWARE

THERMOSTAT

Application filed July 9, 1925. Serial No. 42,427.

The present invention relates to expansible metal bellows, and is a division in part of my copending application, Serial No. 741,688, filed October 4, 1924.

The object of the present invention is twofold: to provide a metallic bellows having a new and improved form of end closure, and to provide a liquid-filled metallic bellows functioning as a thermostat which is capable of operation over a comparatively wide temperature range.

The present thermostat is designed for the control of temperatures which may reach 400° F., thus representing an extreme variation of temperature ranging from 350° F. to 400° F. I have found that even employing a liquid which has a relatively small expansion and contraction with changes in temperature the expansion of the bellows thermostat with the extreme variations of temperature may be sufficient to impart a permanent set to the material, or, in other words, exceed the elastic limit beyond which the thermostat cannot return to its initial form. The disadvantageous effect of the expansion and contraction of the thermostatic liquid on the metallic bellows cannot be successfully overcome by variations in the length or diameter of the bellows.

I have found, however, that by enclosing within the bellows a member of solid material having a ratio of expansion and contraction less than that of the liquid the change in length of the bellows for any given temperature range may be decreased as desired. In the illustrated embodiment of the invention, a glass tube slightly shorter than the length of the interior chamber within the thermostat is enclosed therein and surrounded by the thermostatic liquid. Upon expansion of the liquid, due to increase in temperature, the length of the interior chamber increases substantially with respect to the length of the solid member, providing a reserve chamber beyond the member. The creation of this reserve chamber provides for a substantial increase in the cubical capacity of the metallic bellows without causing a corresponding increase in length of the bellows. It must be evident to those skilled in the art that through the provision of such a construction the expansion of the metallic bellows may be maintained within reasonable limits even when operating under wide variations of temperature.

Figure 1:
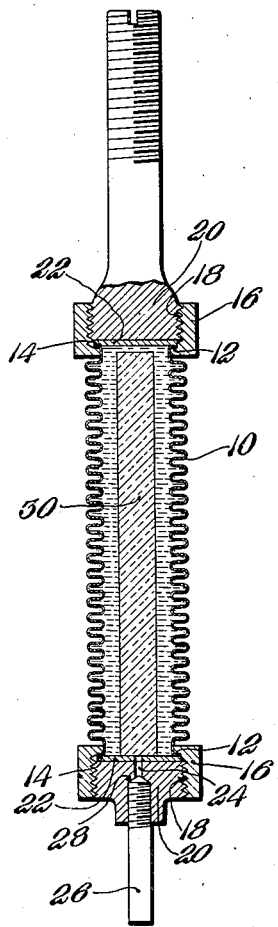
Figure 2:
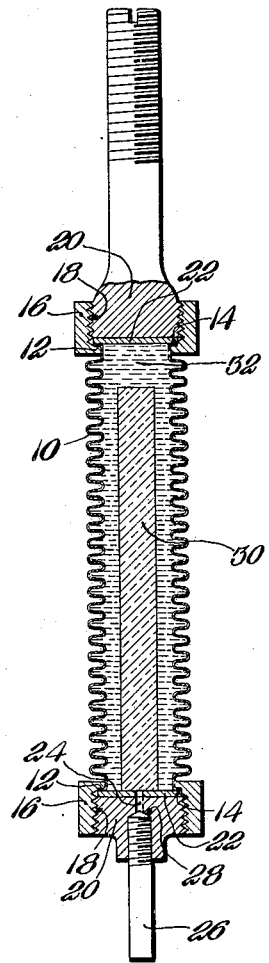

In the accompanying drawings illustrating the preferred form of the invention, Fig. 1 represents a section in elevation of the improved thermostat illustrating the approximate positions of the parts at normal or atmospheric temperature; and Fig. 2 is a similar view of the thermostat illustrating the positions of the parts at the extreme operating temperature, which may approximate 350° F.

The thermostat shown in the illustrated embodiment of the invention is primarily intended for rectifying lubricating oil at temperatures ranging from 300° F. to 400° F. This thermostat consists of an elongated metallic bellows of comparatively small diameter sealed at opposite ends to provide a chamber for an expansible liquid which governs the expansion and contraction of the bellows. As indicated more particularly in the drawings, the tubular bellows 10 are provided at opposite ends with radial flanges 12 which are seated against inwardly extending shoulders 14 formed in heads 16. The heads 16 are interiorly threaded at 18 and are engaged by plug members 20 threadedly connected with the heads and clamping the radial flanges 12 through the interposition of relatively soft metallic washers 22, as clearly indicated. It will be evident that with this construction, a cup-shaped end fitting is produced provided with an opening in the bottom which encircles the bellows between the radial flange and the next adjacent convolution. The opening in the bottom of the end fitting is of lesser diameter than the outer convolution of the bellows, and may approximate the diameter of the inner convolution. Cooperating with this cup-shaped fitting is a complementary fitting threaded thereinto and serving to clamp the flange against the shoulder through the interposition of the soft metal washer. The result is an extremely compact and efficient end closure which successfully resist leakage under high pressures and which can be made without the employment of solder which may be troublesome in operating at high temperatures. In the illustrated embodiment of the invention, the tubular bellows are made of phosphor bronze, the heads and plug members of steel, and the washers of soft copper or brass which will embed and seal the flanges under the clamping action of the plugs. One of the heads 16 is preferably provided with a filling passage 24 for supplying the expansible liquid to the interior of the member, this passage being closed and sealed by a stem 26 threaded within the plug member 20 and having a tapered inner end 28 engaging with a correspondingly tapered seat formed on the end of the passage. The interior of the bellows is completely filled with oil of such a character that it does not vaporize under the temperatures to which the thermostat is subjected. Also enclosed within the metallic bellows and displacing a considerable quantity of oil is a rod 30 formed of glass or other relatively inexpansible material. It will be evident that although a glass rod is enclosed within the thermostat, as shown, nevertheless a closed metallic tube or member of other solid material might be employed to equal advantage, providing always that the ratio of expansion of the solid member is less than that of the liquid within the thermostat. Upon expansion of the liquid, due to an increase in temperature, the parts assume the approximate positions shown in Fig. 2. In this position, the expansion of the bellows, due to the increase in body of the liquid, has exceeded the increase in length of the rod 30, creating a reservoir or chamber 32 beyond the rod. The creation of this chamber permits a relatively large increase in the body of the liquid without compelling a corresponding increase in length of the metallic bellows in a manner which will be evident to those skilled in the art. The rate or amount of increase in length of the metallic bellows may be accurately gaged for any given temperature by a proper choice of thermostatic fluid and by properly gaging the length of the member 30.

I claim:

1. A metallic bellows of thin-wall material capable of repeated deflection and having a series of inner and outer convolutions and a flange at the end of the bellows extending outwardly, an end fitting having an annular shoulder extending inwardly behind the flange with an opening of smaller diameter than the outer convolution of the bellows for engaging the bellows between the flange and the next adjacent convolution, a complementary member received within the end fitting and engaging with the opposite side of the flange, means for hermetically sealing the end fitting, complementary member, and flange together and threaded connections between the end fitting and complementary member.

2. A metallic bellows of thin-wall material capable of repeated deflection and having a series of inner and outer convolutions and a flange at the end of the bellows extending outwardly, an end fitting having an annular shoulder extending inwardly behind the flange with an opening of smaller diameter than the outer convolution of the bellows for receiving the bellows between the flange and next adjacent convolution, a complementary member received within the end fitting and engaging with the opposite side of the flange, and having an opening extending therethrough communicating with the interior of the bellows and means for hermetically sealing the end fitting, complementary member, and flange together.

3. A metallic bellows of thin-wall material capable of repeated deflection and having a series of inner and outer convolutions and a flange at the end of the bellows extending outwardly, a cupped fitting having an opening in the bottom portion encircling the tubular wall of the bellows between the flange and next adjacent convolution, the interior of the cupped fitting being of sufficient diameter to receive the outer circumference of the flange, a complementary fitting received within the cupped fitting and engaging and clamping the opposite side of the flange to the bottom about the opening and means for hermetically sealing the end fitting, complementary member, and flange together.

In testimony whereof I have signed my name to this specification.

WALTER B. CLIFFORD.